(12) United States Patent
Shishido

(10) Patent No.: US 6,892,945 B2
(45) Date of Patent: May 17, 2005

(54) STRUCTURE FOR PREVENTING EXTRANEOUS LIGHT FROM ENTERING IMAGE READING APPARATUS

(75) Inventor: Kazuo Shishido, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/278,338

(22) Filed: Oct. 23, 2002

(65) Prior Publication Data

US 2003/0081275 A1 May 1, 2003

(30) Foreign Application Priority Data

Oct. 26, 2001 (JP) ..................................... 2001-329267

(51) Int. Cl.⁷ ............................................... G06K 7/00
(52) U.S. Cl. ....................... 235/454; 358/475; 358/474; 358/497; 358/461
(58) Field of Search ....................... 235/454; 250/208.1, 250/227.2, 226; 358/443, 468, 471, 474, 475, 497, 461; 399/379

(56) References Cited

U.S. PATENT DOCUMENTS

| | | | | |
|---|---|---|---|---|
| 4,644,159 A | * | 2/1987 | Miura | 250/239 |
| 4,769,718 A | * | 9/1988 | Imamura | 358/482 |
| 4,819,022 A | * | 4/1989 | Kurando | 399/52 |
| 5,331,433 A | | 7/1994 | Sato | |
| 5,570,204 A | | 10/1996 | Kumashiro | |
| 5,666,207 A | * | 9/1997 | Ohmura | 358/500 |
| 6,181,442 B1 | | 1/2001 | Ogura et al. | 358/475 |
| 6,246,484 B1 | * | 6/2001 | Shimamura et al. | 358/1.12 |
| 6,295,140 B1 | * | 9/2001 | Kameyama | 358/461 |
| 6,323,933 B1 | * | 11/2001 | Anzai | 355/23 |
| 6,393,252 B1 | * | 5/2002 | Yamagishi | 399/401 |
| 6,400,854 B1 | * | 6/2002 | Kudoh | 382/317 |
| 6,449,450 B1 | * | 9/2002 | Ozawa | 399/177 |
| 6,462,937 B1 | * | 10/2002 | Liao et al. | 361/680 |
| 6,489,601 B1 | * | 12/2002 | Huang | 250/208.1 |
| 6,552,447 B1 | * | 4/2003 | Fuse | 307/68 |
| 6,750,990 B1 | * | 6/2004 | Ohashi | 358/496 |
| 2001/0022672 A1 | * | 9/2001 | Matsui et al. | 358/461 |
| 2002/0003908 A1 | * | 1/2002 | Kijima et al. | 382/274 |

FOREIGN PATENT DOCUMENTS

| | | |
|---|---|---|
| EP | 1017221 | 7/2000 |
| EP | 1137255 | 9/2001 |
| JP | 63-063273 | 3/1988 |
| JP | 06-090328 | 3/1994 |
| JP | A2000-092289 | 3/2000 |

OTHER PUBLICATIONS

Communitions from European Office dated Jan. 31, 2005 for Appl. No. 02023892.9–1522.
English Abstract of JP 63–063273 Mar. 19,1988.
English Abstract of JP 06–090328 Mar. 29,1994.

* cited by examiner

Primary Examiner—Jared J. Fureman
Assistant Examiner—Allyson N Trail
(74) Attorney, Agent, or Firm—Morgan & Finnegan, L.L.P.

(57) ABSTRACT

An image reading apparatus for reading a document has an image sensor unit, which is moved along a platen glass in a sub-scanning direction, mounting an LED, a light guide and a sensor. A white reference panel for use of shading correction is provided on the platen glass on the side thereof opposite the image sensor unit. Light shield plates are provided on the platen glass on the side facing the image sensor unit along both sides of the white reference panel.

23 Claims, 12 Drawing Sheets

SUB-SCANNING DIRECTION

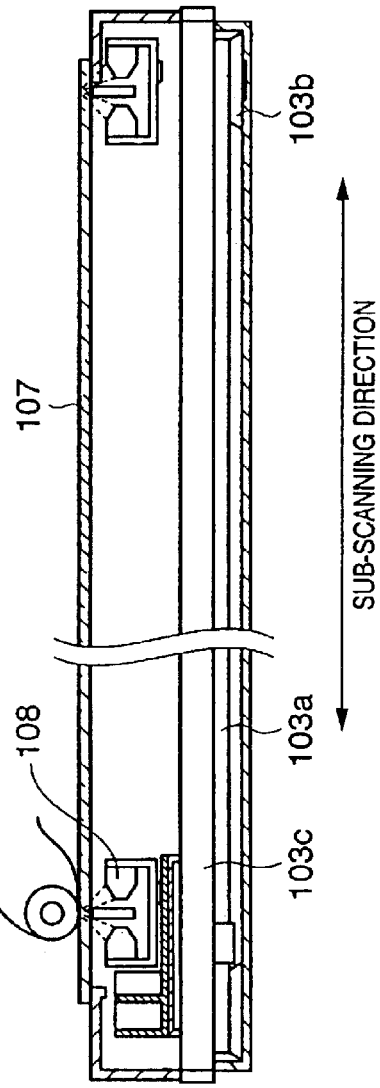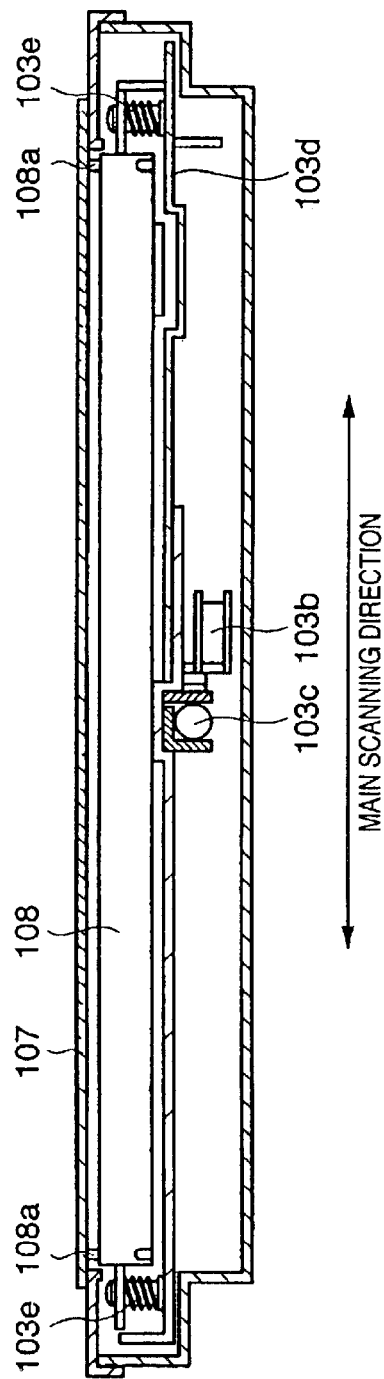

SUB-SCANNING DIRECTION

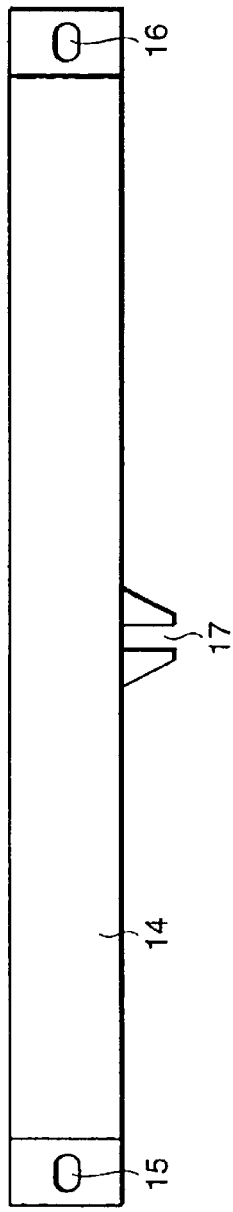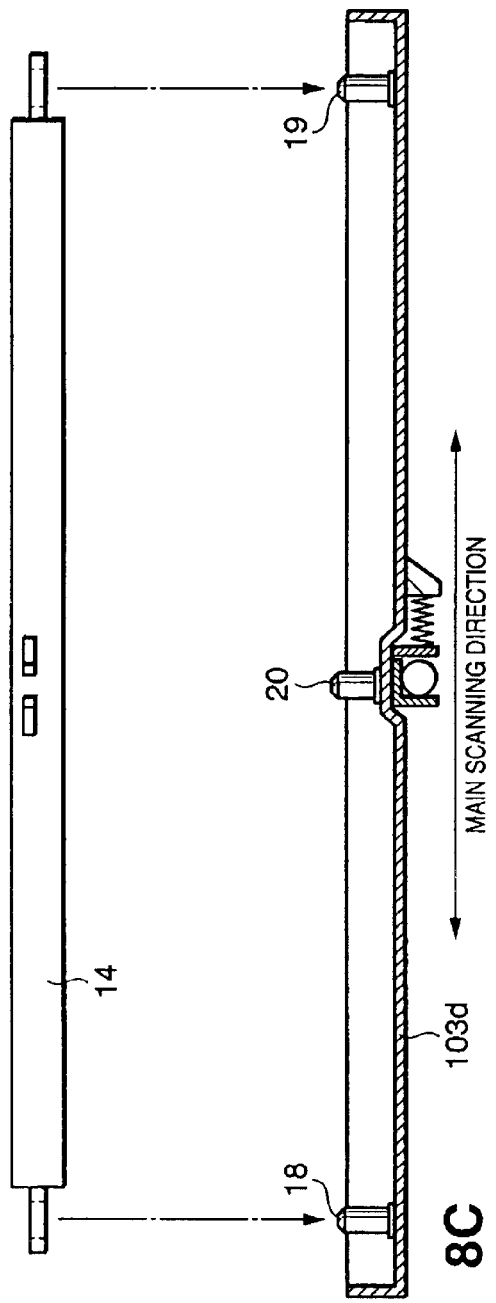

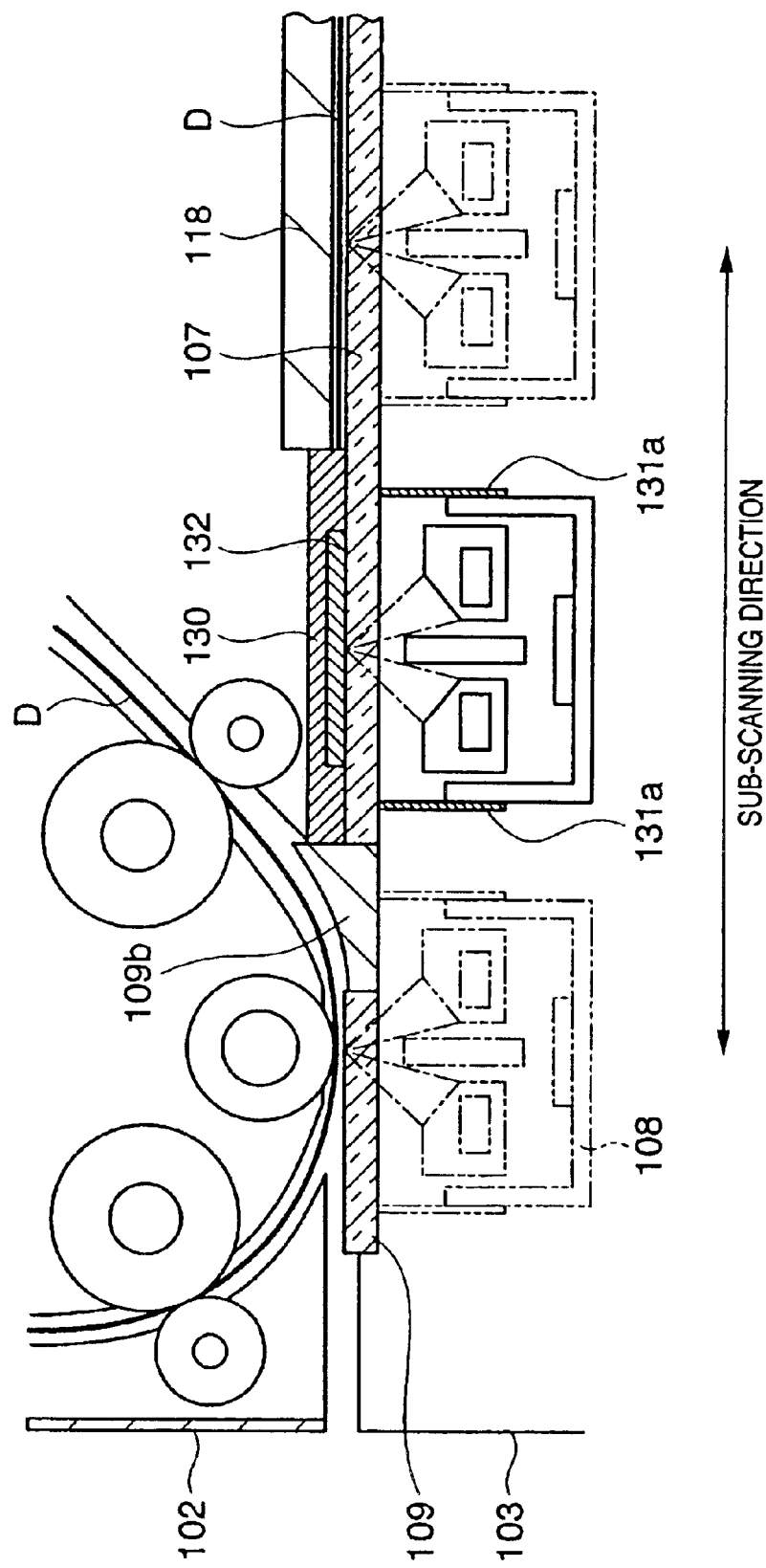

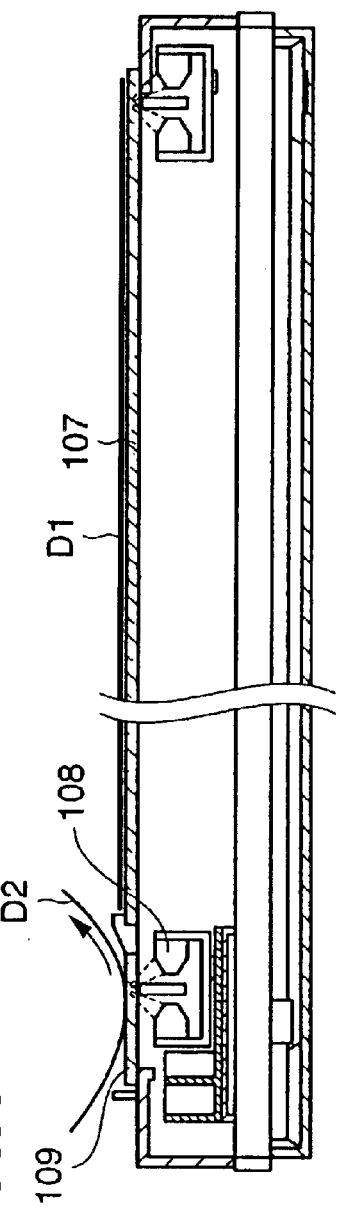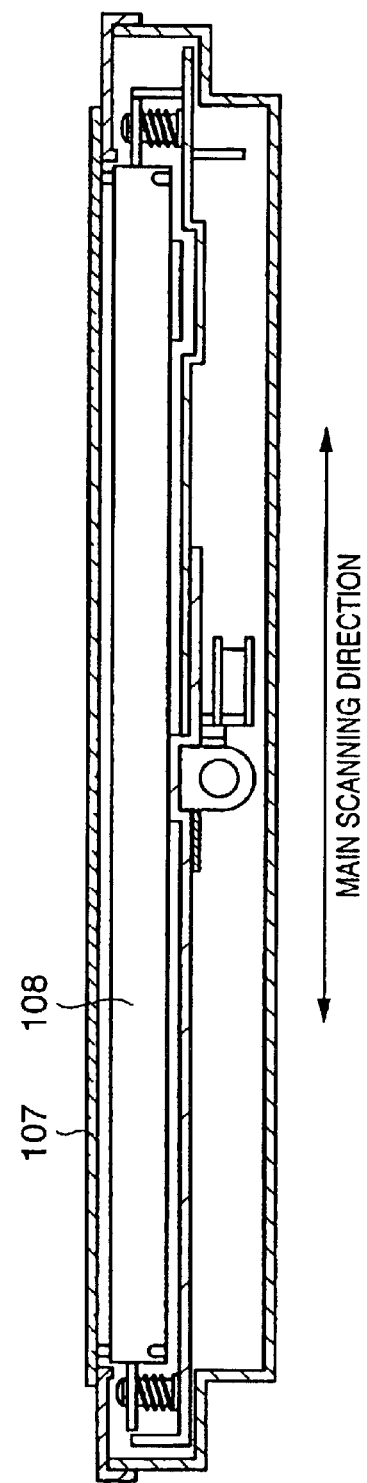
FIG. 11A
FIG. 11B

STRUCTURE FOR PREVENTING EXTRANEOUS LIGHT FROM ENTERING IMAGE READING APPARATUS

FIELD OF THE INVENTION

This invention relates to an image reading apparatus and, more particularly, to an image reading apparatus, which is for reading a document image, used in an image scanner, copier or facsimile machine, etc.

BACKGROUND OF THE INVENTION

Image readers are included in copiers, multifunction machines having copier and facsimile functions, and image scanners having an automatic document feeder (ADF). In such an image reading apparatus that has been proposed, the apparatus has both a function for fixing a document on a glass surface and scanning an optical system relative to the document (this shall be referred to as "stationary reading" below), and a function for holding the optical system fixed and performing scanning by moving the document relative to the optical system (this shall be referred to as "continuous reading").

FIGS. 11A and 11B illustrate the internal structure of a conventional image reading apparatus having both the stationary reading function and the continuous reading function, in which FIG. 11A is a side view as seen from the main scanning direction and FIG. 11B a side view as seen from the sub-scanning direction.

As shown in FIGS. 11A and 11B, a contact image sensor (CIS) 108 serving as an image reading device in an image reading section is placed beneath glass members, namely a platen glass 107 and continuous reading glass 109. In the case of stationary reading, a stationary document D1 that has been placed on the platen glass 107 is read while the CIS 108 is moved in the sub-scanning direction (transversely in FIG. 11A). In the case of continuous reading, the CIS 108, which is held stationary below the continuous reading glass 109, reads a document D2 that travels past the continuous reading glass 109.

When a document is read, the document is illuminated with light from an illuminating source and light reflected from the document is converted to an electrical signal by a photoelectric converter group (CCD), thereby allowing image information to be read.

There are instances where the illuminance of illumination applied to the document is non-uniform in the main scanning direction (transversely in FIG. 11B) or where the sensitivity of the CIS 108 is non-uniform in the main scanning direction. In order to compensate for such non-uniformity, a shading correction for white and black colors is applied to compensate for non-uniformity in the main scanning direction, as described in the "Prior Art" section of the specification of Japanese Patent Application Laid-Open No. 2000-092289.

An ordinary CCD (group of photoelectric converters) will now be described in brief.

A CCD is divided into a charge storage section and a charge transfer section. Document image data is represented by amount of electric charge produced in proportion to the amount of light that incidents on a charge storage layer at each pixel of the CCD. (The signal output is a voltage value V proportional to amount Q of electric charge.)

The incident light that impinges upon the charge storage layer contains extraneous light, which is light other than the reflected light from the document having the image information. The distinction between entrant light that is reflected light and entrant light that is extraneous light cannot be made based upon the output signal. In other words, letting L represent the amount of incident light on a photodiode constituting the CCD, R the amount of light reflected from the document and S the amount of extraneous light, we have L=R+S.

Thus, a CCD essentially possesses such a characteristic that the signal level thereof is readily susceptible to the effects of an extraneous-light noise component. If R>>S holds, however, the output signal is almost unaffected by extraneous light. In a conventional reading apparatus that uses a CCD, therefore, the amount R of reflected light from the document is made sufficiently larger than the amount S of extraneous light by using an exposing light source having a high illuminance, as a result of which the effects of extraneous light will not appear in the signal output.

In recent years, however, CCD sensitivity has been improved by a wide margin, thereby making it possible to set the exposing light source to a comparatively low illuminance. Setting a comparatively low illuminance for the illuminating light source makes it possible to reduce power consumption and lower cost. In particular, with a contact sensor (same-size magnification optical system), it is possible to adopt an exposing light source such as a low-illuminance LED array or LIDE light source (which employs an LED and a linear light guide).

This reduction in the luminance of the exposing light source is accompanied by a smaller difference between the amount R of reflected light and the amount S of extraneous light. As a consequence, when a shading or dimming operation is performed, the level of noise is such that the extraneous-light noise component acting upon the CCD is no longer negligible. This may invite a decline in the level of the output signal and may eventually lead to degradation of the output image (the image that is printed out).

This phenomenon will now be described in detail.

When shading is performed, a white reference panel is read in before the document image starts to be read, the output waveform of the white reference panel (white shading) is obtained, and then the document image is read in, with the output waveform of the white reference panel being regarded as absolute white. If white shading data is taken with a document cover plate which is for preventing curling of a document placed on a platen glass left open, extraneous light will enter. In such case an output that is much larger than the normal white shading data will become the white shading data.

FIG. 12A is a waveform diagram illustrating the output of a contact image sensor (CIS) in a case where a white reference panel free of the effects of extraneous light is read, and FIG. 12B is a waveform diagram illustrating the output of a contact image sensor (CIS) in a case where the white reference panel is read under the influence of extraneous light.

In FIG. 12B, the zone C represents the increase in the output component ascribable to the effects of extraneous light. If the white reference output thus becomes greater than it was originally, the white illuminance of the document will undergo an apparent decline and, hence, the read image will be subjected to a correction that darkens the image.

SUMMARY OF THE INVENTION

The present invention has been made in consideration of the above circumstances and its object is to improve the quality of a read image by preventing the intrusion of unnecessary light from the outside.

According to the present invention, the foregoing object is attained by providing an image reading apparatus comprising; an illumination unit adapted to illuminate a subject; an image reading unit adapted to read an image of the subject illuminated by the illumination unit; a transparent member having a light transmitting property provided between the subject and the image reading unit; a reference member, which is provided on the transparent member, adapted for use as an illuminance reference in order to correct an image signal that is output from the image reading unit; and a light shielding member provided along the reference member on the transparent member on a side thereof facing the image reading unit.

According to the present invention, the foregoing object is attained by providing an image reading apparatus comprising; an illumination unit adapted to illuminate a subject; an image reading unit adapted to read an image of the subject illuminated by the illumination unit; a transparent member having a light transmitting property provided between the subject and the image reading unit; a case adapted to mount the illuminating unit and the image reading unit; and a light shielding member provided on the case along a main scanning direction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIGS. 5A and 5B are diagrams illustrating the internal structure of the image reader, in which FIG. 5A is a side view as seen from the main scanning direction and FIG. 5B a side view as seen from the sub-scanning direction;

FIG. 8A is a plan view illustrating a frame that is a structural component of the image sensor unit;

FIG. 8B is a side view illustrating the frame;

FIG. 8C is a side view of a carriage;

FIG. 10 is an enlarged sectional view showing the vicinity of a white reference panel in another embodiment of the present invention;

FIGS. 11A and 11B are diagrams illustrating the internal structure of a conventional image reading apparatus having both a stationary reading function and a continuous reading function, in which FIG. 11A is a side view as seen from the main scanning direction and FIG. 11B a side view as seen from the sub-scanning direction;

DETAILED DESCRIPTION OF THE PREFERRED EMBODIMENTS

Preferred embodiments of the present invention will be described in detail in accordance with the accompanying drawings. It should be noted that the dimensions, materials, shapes and relative placement of the structural components exemplified in the embodiments may be modified appropriately depending upon the structure of the apparatus to which the invention is applied as well as various conditions, and that the present invention is not limited to illustrated example.

Embodiments of an image reading apparatus according to the present invention will be described with reference to FIGS. 1 to 12. The embodiments will be described taking as an example a case where the image reading apparatus is mounted on a copier. FIG. 2 is a sectional view of the copier as seen from the front side, FIG. 3 is a perspective view of the copier, and FIG. 4 is an enlarged sectional view of an image reader according to an embodiment.

An overview of the structure of the overall copier will be described first.

Figure 2:
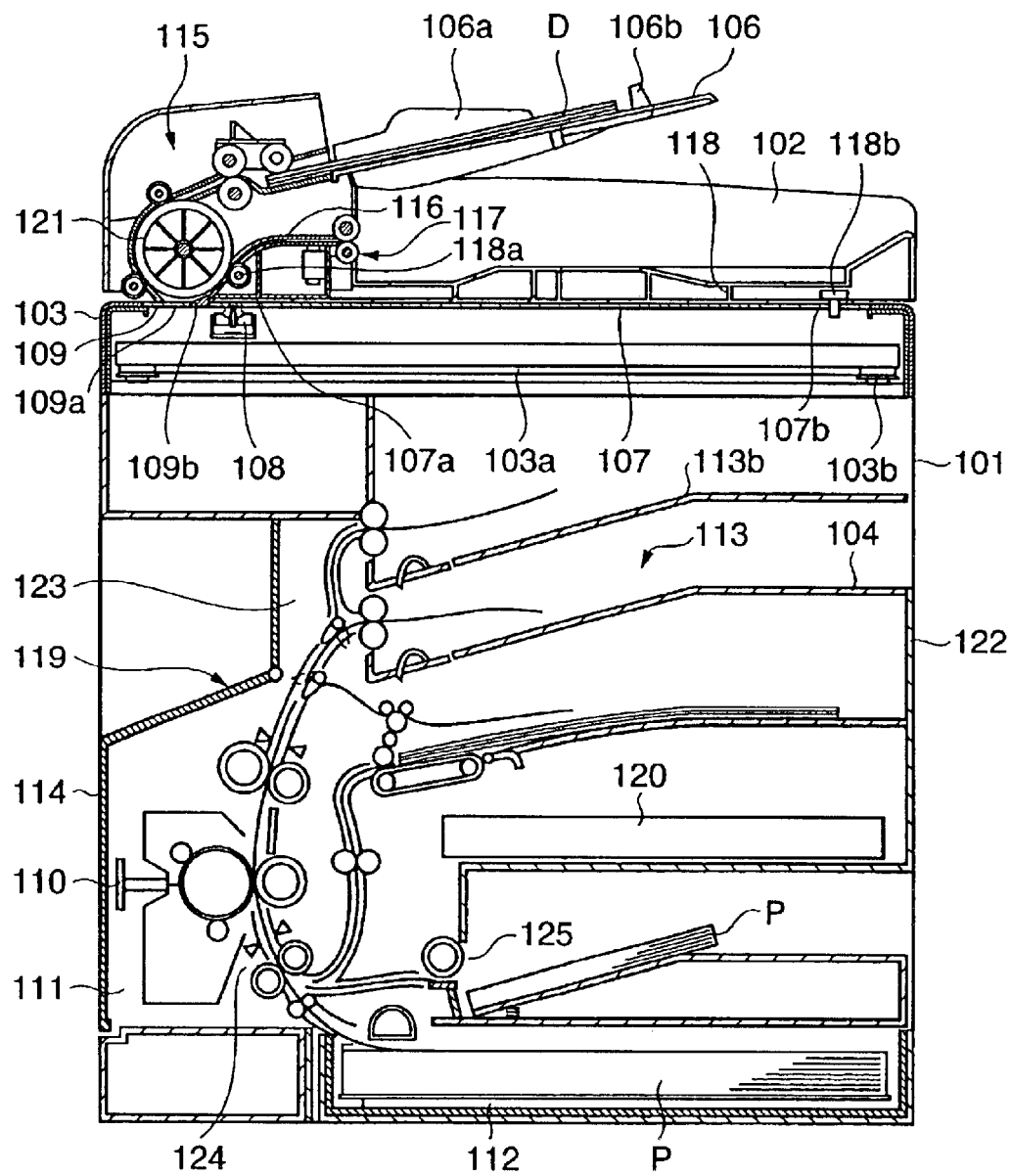
FIG. 2 is a sectional view, as seen from the side, of a copier equipped with an image reading apparatus according to this embodiment.
Figure 3:
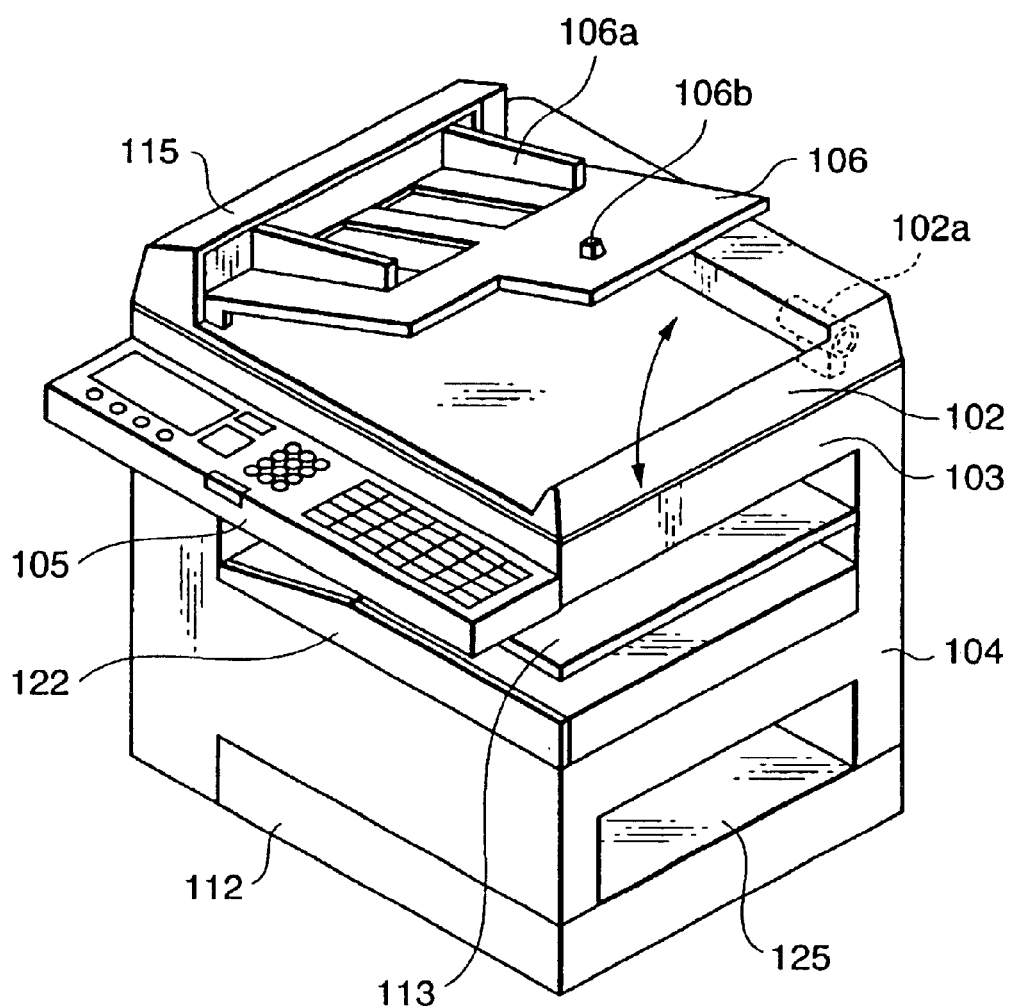
FIG. 3 is a perspective view of the copier.
Figure 4:
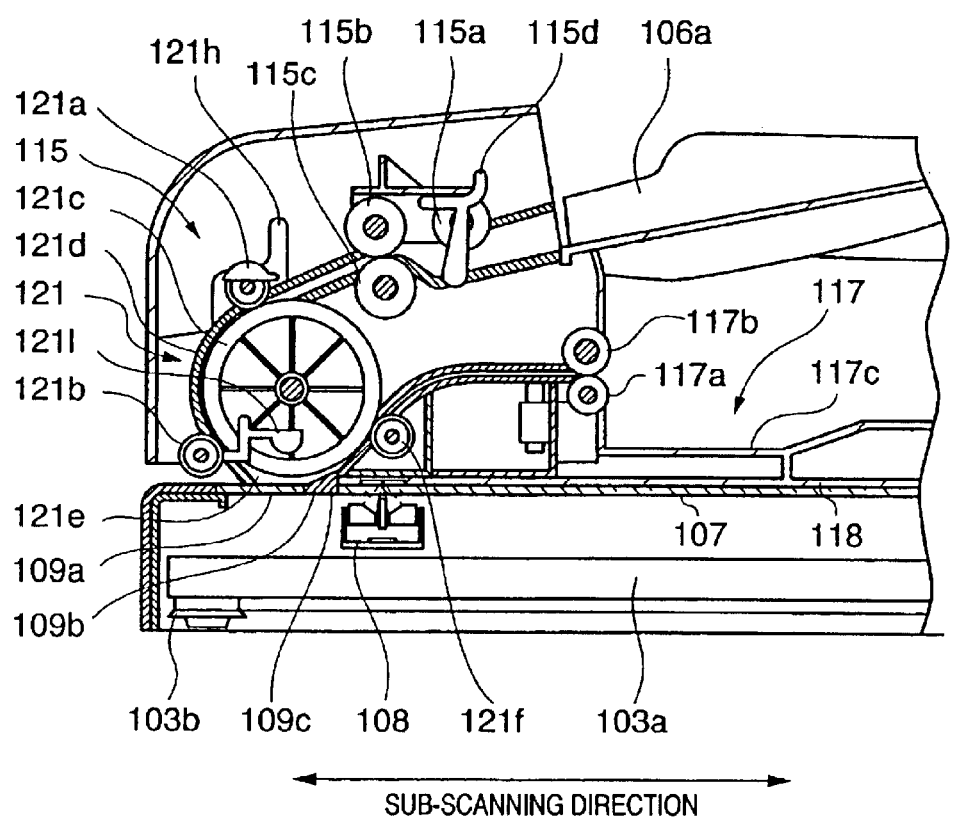
FIG. 4 is an enlarged sectional view illustrating the structure of an image reader.

Shown in FIGS. 2, 3 and 4 are the main body 101 of the apparatus; a cover plate 102 of an ADF (automatic document feeder), on which multiple sheets of sheet documents D are placed for being separated and transported one sheet at a time; an image reader 103 for reading color image information on the surface of the sheet document D or from a book or the like placed upon a platen glass 107; the main body 104 of a recording device comprising an electrophotographic printer that uses an LED array; a control panel 105 configured with a display unit and input keys; a document stacker 106; a contact image sensor unit 108 serving as a scanning unit; and a continuous reading glass 109.

Also shown are an LED head unit 110; an image forming section 111; a cassette feeder 112; a printed-sheet ejection section 113 so adapted that a plurality of sheets P can be placed on the main unit 104 of the recording device; a cartridge cover 114; an ADF separating unit 115; a paper transport section 116; a document ejection section 117; a document pressure plate 118 for applying pressure to a document such as a book document; a combined section 119 consisting of the image reader 103 and main unit 104 of the recording device; a copier controller 120; a sheet-document transport section 121; a double-sided transport section cover 122; a transport-direction changeover unit 123; a registration transport section 124; and an MP (multipaper) feeder 125 placed within the main unit 104 of the recording device.

Described first will be the stationary reading operation performed when a stationary document such as a book is read.

The ADF cover plate 102 is pivotally mounted on the image reader 103 via hinges 102a. The hinges 102a are provided at the back of the apparatus on its left and right sides (the hinge on the left side is not shown) so that the ADF cover plate 102 can be opened and closed by lifting the front side of the cover (see the arrows in FIG. 3). By means of a combination of dampers, cams and spring members, etc., the hinges 102a make it possible to open the ADF cover plate 102 and to hold it open at a prescribed angle (e.g., 70°). With the ADF cover plate 102 open, a document can be placed on the platen glass 107.

The image sensor unit 108 illuminates the document surface from a light-source device comprising an LED serving as the light-emitting element and a plastic light guide, and forms light, which has been reflected at the document surface, on a one-dimensional sensor array, which serves as a photoelectric converter, by a SELFOC lens constituting an image forming optical system, thereby reading image information.

As shown in FIG. 5A, the image sensor unit 108 is capable of being moved transversely in FIG. 5A along a guide shaft 103c and can be moved to a desired position by a timing belt 103a, drive pulley 103b and drive motor (not shown). FIGS. 5A and 5B are diagrams illustrating the internal structure of the image reader 103, in which FIG. 5A is a side view as seen in the main scanning direction, which is perpendicular to the length direction of the guide shaft 103c, and FIG. 5B a side view as seen in the sub-scanning direction, which is parallel to the length direction of the guide shaft 103c.

Further, as shown in FIG. 5B, the image sensor unit 108 is supported on the guide shaft 103c via a carriage 103d serving as a casing, and is biased upward by a spring 103e. A spacer 108a is interposed between the image sensor unit 108 and platen glass 107. The image sensor unit 108 moves along the guide shaft 103c at a uniform speed and reads the image from a document, which has been placed on the platen glass 107, over a prescribed range from a stationary-reading starting position 107a (FIG. 2) to a stationary-reading end position 107b (FIG. 2).

With reference again to FIGS. 2 to 4, the document pressure plate 118 consists of a laminate of a white sheet and sponge or the like and prevents the curling of a document placed on the platen glass 107. The document pressure plate 118 has a left edge 118a that extends beyond the left side of the stationary-reading starting position 107a, and a right edge 118b that extends beyond the stationary-reading end position 107b.

The reading of the sheet documents D will be described next.

The ADF separating unit 115 comprises a pickup roller 115a disposed so as to be movable up and down by an actuator (not shown), a separation roller 115b and a retarding roller 115c held in pressured contact with the separation roller 115b and rotated in the opposite direction to the rotation direction of the separation roller 115b.

First, the sheet documents D, which are placed face-up on the document stacker 106, are retained under pressure by lowering the pickup roller 115a and are fed between the separation roller 115b and the retarding roller 115c so as to be separated one sheet at a time by the separation roller 115b in pressured contact with the retarding roller 115c. Next, the sheet is transported over a U-turn paper path along a document guide 121d by separating transport rollers 121a, 121b, which are biased by a biasing spring (not shown), and a reading transport roller 121c that is in pressured contact with the rollers 121a, 121b.

Next, the sheet document D is transported to the continuous reading glass 109 and, while being held in intimate pressured contact with the continuous reading glass 109 by a sheet-document retaining plate 121e biased by a biasing spring (not shown), has the image information read from its surface at a sheet-document reading position 109a. At this time the image sensor unit 108 is moved to the sheet-document reading position 109a and comes to rest at this position.

Next, the sheet document D is returned to the side of the ADF cover 102 by a jump base 109b and is transported by a reading transport roller 121f, which is biased by a biasing spring, and the reading transport roller 121c in pressured contact with the roller 121f.

The sheet document is then ejected into a document output tray 117c by a paper ejecting roller 117a, which is biased by a biasing spring, and a paper ejecting roller 117b that is in pressured contact with the roller 117a.

The document stacker 106 is fixedly disposed on the ADF cover 102 and is provided with a slider 106a capable of sliding at right angles to the transport direction of the sheet documents D (i.e., in the direction parallel to the width direction of the sheet documents D). It is so arranged that both sides of the sheet documents D stacked on the document stacker 106 can be made even by the slider 106a. Further, a document-length sensor 106b is disposed on the document stacker 106 and is capable of sensing the length of the sheet documents D placed on the document stacker 106. Whether sheet documents D are present or not as well as the width thereof can be sensed by a plurality of document-width sensors 115d disposed on the ADF separating unit 115 in the width direction of the sheet documents D. Document size and set orientation can be sensed by a combination of the outputs from the document-width sensors 115d and document-length sensor 106b.

Further, a document-feed sensor 121h and a document-edge sensor 121i are disposed on the sheet-document transport section 121. The document-feed sensor 121h senses whether a sheet document D has been fed from the ADF separating unit 115 and senses whether the trailing edge of the sheet document D has passed by. The document-edge sensor 121i senses traversal of the leading and trailing edges of the sheet document D. The output of the document-edge sensor 121i is used in controlling read timing.

As mentioned above, the image sensor unit 108 is so as adapted as to read a document image by illuminating the document by a light source and causing light reflected from the document to incident on the sensor array, which constitutes the photoelectric converter, via the SELFOC lens, which is the image forming optical system.

Figure 6:
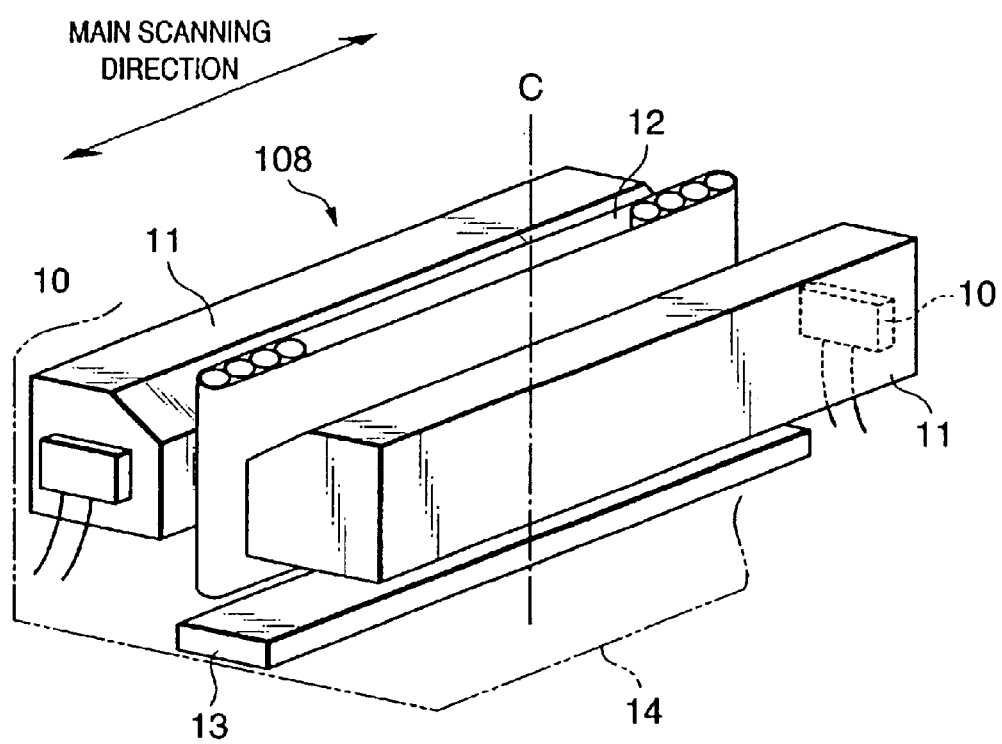
FIG. 6 is a perspective view illustrating the structure of an image sensor unit.

FIG. 6 is a perspective view illustrating the detailed structure of the image sensor unit 108.

The image sensor unit 108 includes a pair of LEDS 10 serving as light-emitting elements, and a pair of light guides 11 for guiding light, which has been emitted by the LEDs 10, to the document. These elements construct a pair of light-guiding light sources along both sides of a SELFOC lens array 12 that constructs the image forming optical system. A sensor 13, which comprises photoelectric converters, is disposed directly beneath the SELFOC lens array 12. Each of these image-sensor structural members is disposed within a frame 14.

The LEDs 10 are fixed onto either end of respective ones of the light guides 11 in the longitudinal direction thereof. In the illustrated example, one LED 10 is provided on one end of one of the light guides 11 and one LED 10 is provided on the other end of the other light guide 11. Thus, the arrangement is such that the two LEDs 10 and two light guides 11 are disposed in point symmetry with respect to the central axis C.

Figure 7:
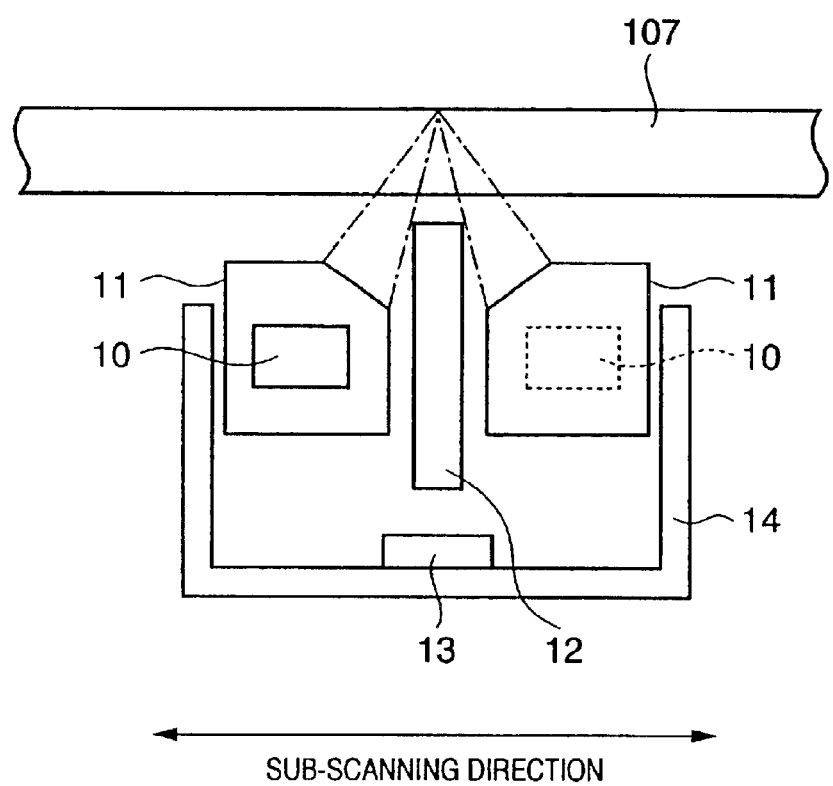
FIG. 7 is a sectional view illustrating the structure of the image sensor unit.

The light emitted from each LED 10 advances while being repeatedly reflected within the respective light guide 11, as a result of which light is emitted to the outside along the full length of the light guides 11. The light emitted from the light guides 11 illuminates a document on the platen glass 107 or continuous reading glass 109, as shown in FIG. 7, and each of the reflected light rays incidents on the sensor 13 via the SELFOC lens array 12. FIG. 7 is a sectional view of the image sensor unit 108.

Figure 9:
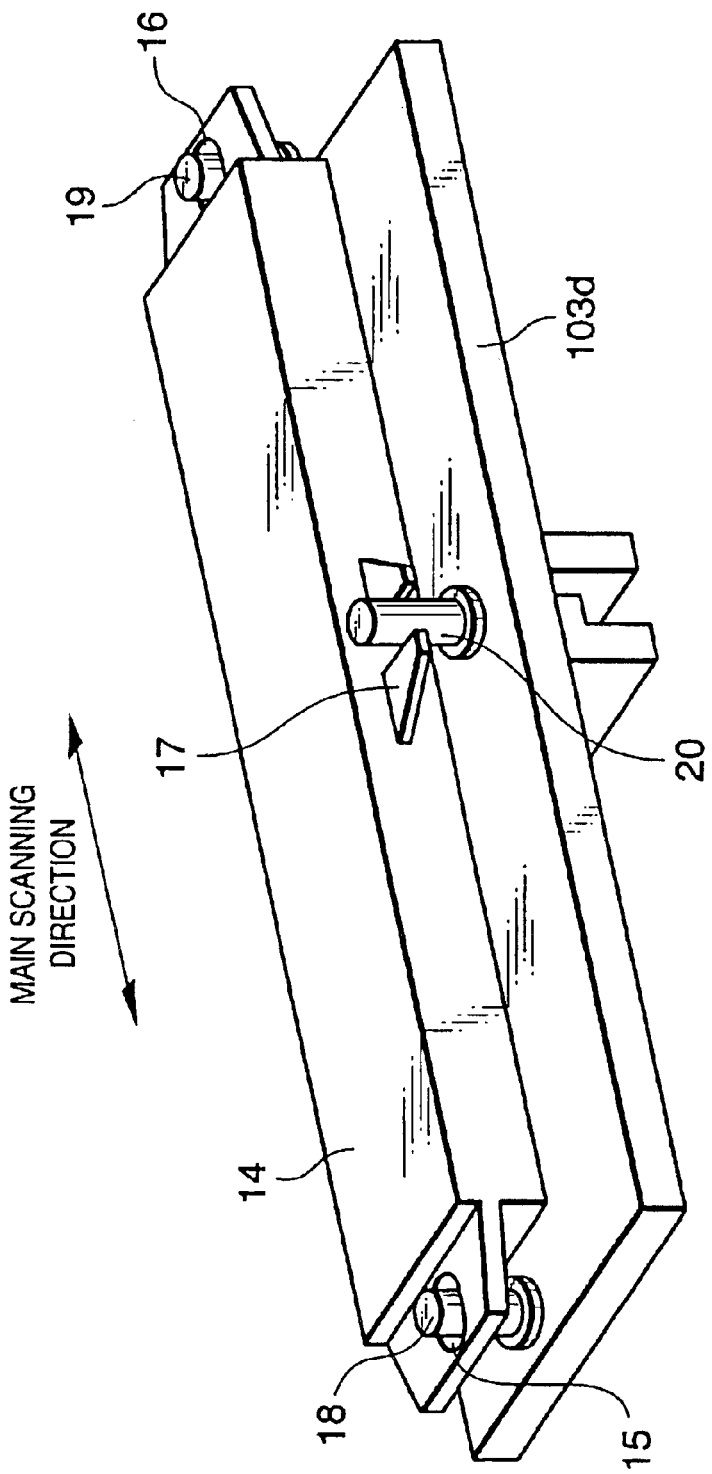
FIG. 9 is a perspective view showing the frame and the carriage in the combined state.
Figure 12A:
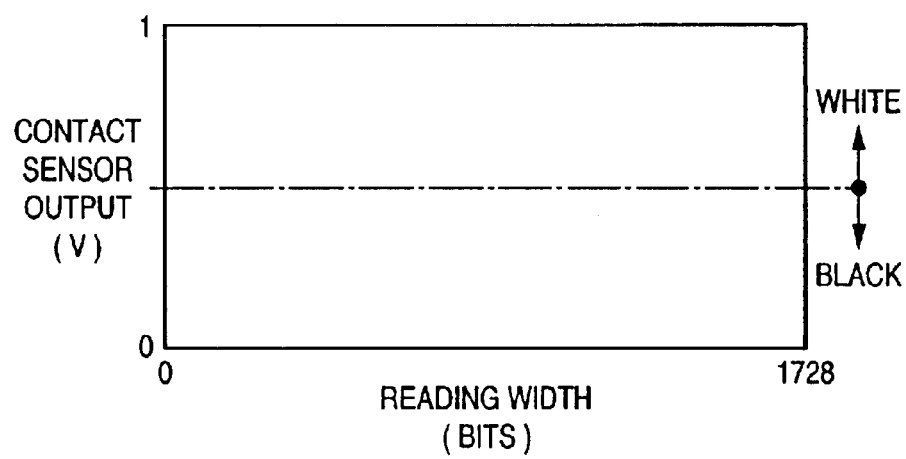
FIG. 12A is a waveform diagram illustrating the output of a contact image sensor in a case where a white reference panel free of the effects of extraneous light is read.
Figure 12B:
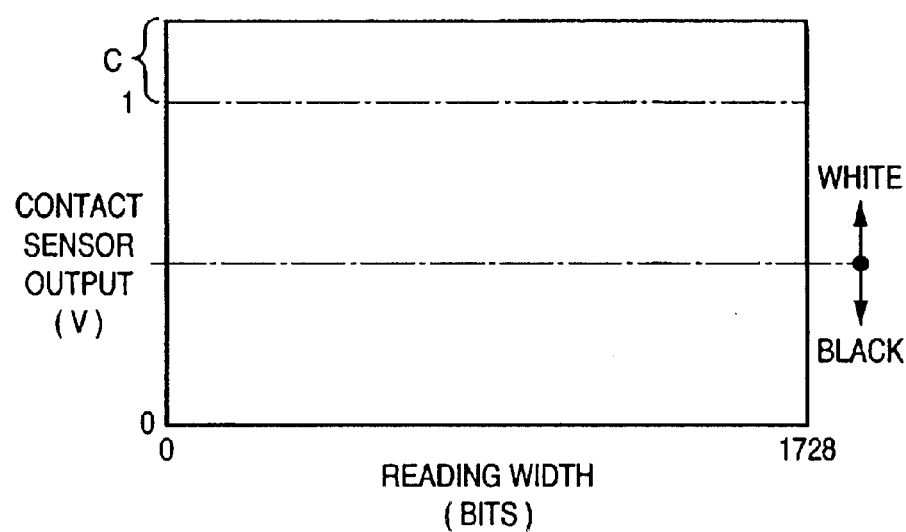
FIG. 12B is a waveform diagram illustrating the output of the contact image sensor in a case where the white reference panel is read under the influence of extraneous light.

FIGS. 8A to 8C are diagrams illustrating structural components of the image sensor unit 108, in which FIG. 8A is a plan view of the frame 14, FIG. 8B is a side view of the frame 14 and FIG. 8C is a side view of the carriage 103d. FIG. 9 is a perspective view showing the frame 14 and the carriage 103d in the combined state.

The frame 14 accommodating the structural components of the image sensor is provided at both ends with oblong holes 15, 16 for positioning in the sub-scanning direction, and is further provided with a positioning portion 17, which is for positioning in the main scanning direction, between the oblong holes 15 and 16.

The carriage 103d is provided at both ends with bosses 18, 19 and with a boss 20 located substantially midway between the bosses 18, 19. Owing to the bosses 18, 19, the oblong holes 15, 16 of the frame 14 have their positions limited in the sub-scanning direction while they are furnished with a degree of freedom in the main scanning direction. Owing to the boss 20, the portion 17 for positioning in the main scanning direction has its position limited in the main scanning direction while it is furnished with a degree of freedom in the sub-scanning direction. As a result, the frame 14 is held on the carriage 103d so as to be movable only up and down (the frame 14 is biased upward by the spring 103e shown in FIG. 5B) while being guided by the bosses 18, 19 and 20.

Thus, the frame 14 is guided by the bosses 18, 19, 20 and is urged toward the surface of the platen glass 107. As a result, the arrangement is such that the distance between the sensor 13 and surface of the platen glass 107 is held fixed at all times so that an excellent, blur-free image may be read.

Figure 1:
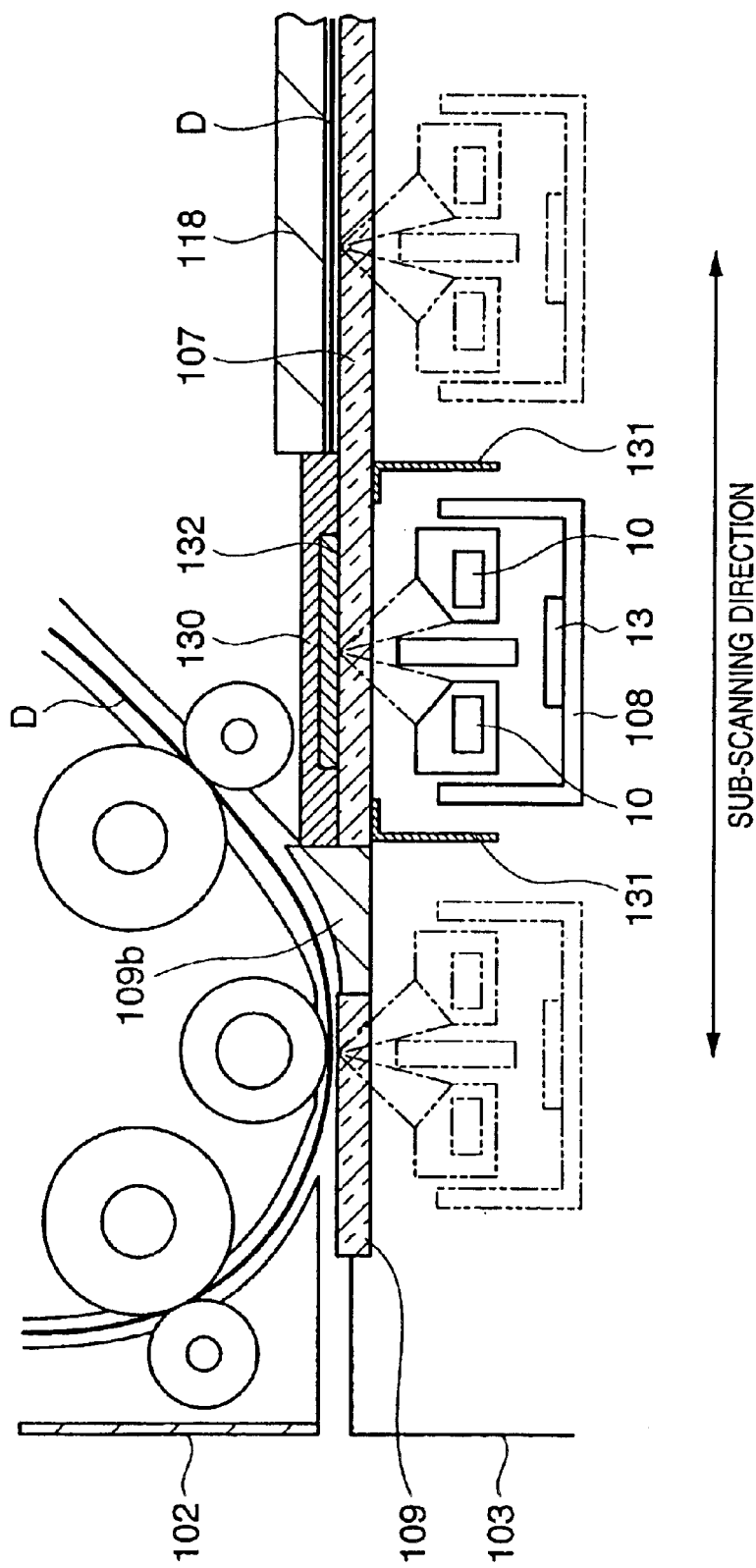
FIG. 1 is an enlarged sectional view showing the vicinity of a white reference panel according to an embodiment of the present invention.

FIG. 1 is an enlarged sectional view-showing the vicinity of a white reference panel. A shading operation will now be described in detail with reference to FIG. 1.

A white reference panel 132 is secured to the top side of the platen glass 107 at the left end thereof between a document abutment 130 and the platen glass 107. Before reading the image from the document D, the image sensor unit 108 performs a well-known shading operation in order to compensate for a variation in the amount of light from the light-guiding light sources in the main scanning direction and a variation in light-receiving sensitivity of the sensor 13 in the main scanning direction. More specifically, the image sensor unit 108 is moved below the white reference panel 132, then light is emitted from the LEDs 10 to illuminate the white reference panel 132. The reflected light is received by the sensor 13, which produces an absolute-white output signal serving as a reference. Next, the LEDs are extinguished and the sensor 13 receives any available light, thereby producing an absolute-black output signal. A shading operation is performed by utilizing these output signals, making it possible to read the document image in highly precise fashion.

Shielding plates 131 are provided on the bottom side of the platen glass 107 on both sides of the white reference panel 132. More specifically, the two shielding plates 131 are longer than the white reference panel 132 in the main scanning direction (the depth direction in FIG. 1) and are disposed at a spacing that is greater than the width of the white reference panel 132 in the sub-scanning direction (the transverse direction in FIG. 1). As a result, the white reference panel 132 is shielded in its entirety from extraneous light so that an image can be read accurately. Furthermore, the shielding plates 131 may be extended in the sub-scanning direction along both edges of the white reference panel 132, though this is not illustrated. In such case the white reference panel 132 is enclosed from four sides by the shielding plates 131. The shielding plates 131 consist of a thin, black, sheet-like member and exhibit resiliency. As a result, even when the shading operation is performed with the ADF cover 102 left open, it is possible to perform shading correction correctly because extraneous light from the platen glass 107 and continuous reading glass 109 will not reach the sensor 13. In a case where it is so arranged that the shielding plates 131 contact the image sensor unit 108 in order to eliminate a clearance between the plates and the unit, shielding is performed more positively in comparison with an arrangement in which there is no contact. On the other hand, in a case where it is so arranged that the shielding plates 131 do not contact the image sensor unit 108 in order to afford a clearance between the plates and the unit, there is no danger that the image sensor unit 108 and shielding plates 131 will be damaged, unlike the former case.

In order for the image sensor unit 108 to read the image on the document D placed on the platen glass 107 or the image on the document D conveyed over the continuous reading glass 109 after the shading operation is completed, the image sensor unit 108 is moved to the respective reading positions. At such time the image sensor unit 108 passes over the walls of the shielding plates 131. Since the shielding plates 131 are made of the resilient members, as mentioned above, they will undergo deformation if contacted by the image sensor unit 108 and will therefore allow the image sensor unit 108 to pass without impeding its movement.

It is described above that the shielding plates 131 are provided on the bottom side of the platen glass 107 on both sides of the white reference panel 132 so as to surround the periphery of the white reference panel 132. However, the present invention is not limited to this arrangement and may be implemented as shown in FIG. 10, by way of example.

FIG. 10 is an enlarged sectional view illustrating the vicinity of the white reference panel. This arrangement basically is the same as that described above. Components identical with those of the above embodiment are designated by like reference characters and need not be described, only the components that differ will be described.

In the above arrangement, the shielding plates 131 are provided on the bottom side of the platen glass 107. In FIG. 10, however, it is so arranged that shielding plates, here identified at 131a, are provided on the frame 14 of the image sensor unit 108.

More specifically, the shielding plates 131a are affixed to the side faces of the frame 14 of image sensor unit 108 at a spacing greater than the width thereof in the sub-scanning direction, and are attached in such a manner that their distal ends will abut against the bottom side of the platen glass 107 and continuous reading glass 109 with substantially no clearance. In a case where it is so arranged that the shielding plates 131a are made to contact the platen glass 107 in order to eliminate a clearance between the plates and the platen glass 107, shielding is performed more positively in comparison with an arrangement in which there is no contact. On the other hand, in a case where it is so arranged that the shielding plates 131a do not contact the platen glass 107 in order to afford a clearance between the plates and the glass, there is no danger that the platen glass 107 and shielding plates 131a will be damaged, unlike the former case.

Further, in a manner identical with that described above, the shielding plates 131a serving as shielding members are made longer than the white reference panel 132 in the main scanning direction, thereby making it possible to accurately read the white reference panel 132 when reference density is adjusted.

Further, an image can be read with more effective shielding by providing the shielding plates 131a so as to surround the frame of the image sensor unit 108 in which the unit that reads the image has been built in.

As a result, the scanning operation of the image sensor unit 108 for reading a document is accompanied by movement of the shielding plates 131a together with the image sensor unit 108 and therefore the intrusion of extraneous light is prevented at all times. Intrusion of extraneous light into the reading section can be prevented not only when a shading operation is performed but also during reading of a document image.

Since there is no gap between the image sensor unit 108 and the platen glass 107 and continuous reading glass 109, dust is prevented from attaching itself to the image sensor unit 108, platen glass 107 and continuous reading glass 109. This makes it possible to prevent a read document image from being degraded by the accumulation of dust. The end result is that the quality of the read image can be improved.

The above embodiments have been described with regard to an image reading apparatus capable of implementing both continuous reading and stationary reading. However, that application of the present invention to either one of these reading methods is possible would readily occur to one skilled in the art.

The present invention is not limited to the above embodiments and various changes and modifications can be made within the spirit and scope of the present invention. Therefore, to apprise the public of the scope of the present invention, the following claims are made.

What is claimed is:

1. An image reading apparatus comprising: an illumination unit adapted to illuminate a subject;
   an image reading unit having a line sensor adapted to read an image of the subject illuminated by said illumination unit;
   a transparent member having a light transmitting property provided between the subject and said image reading unit;
   a reference member, which is provided on said transparent member and extends in a main scanning direction of said line sensor, on a side that the subject is to be placed, adapted for use as an illuminance reference for shading correction applied to an image signal that is output from said image reading unit; and
   a light shielding member provided along said reference member in contact with said transparent member on the other side of the transparent member that said reference member is provided, so as to prevent light, which enters from outside through said transparent member, from being incident on said reference member when the line sensor reads said reference member.

2. The apparatus according to claim 1, wherein said light shielding member has a length greater than that of said reference member along a main scanning direction.

3. The apparatus according to claim 1, wherein two of said light shielding member are provided at a spacing greater than the width of said reference member along a sub-scanning direction.

4. The apparatus according to claim 1, wherein said light shielding member surrounds the approximate periphery of said reference member.

5. The apparatus according to claim 1, wherein said light shielding member comprises a resilient member.

6. The apparatus according to claim 1, wherein said light shielding member comprises a sheet-like member.

7. The apparatus according to claim 1, wherein said light shielding member is substantially black.

8. The apparatus according to claim 1, further comprising a moving unit, on which said illumination unit and said image reading unit are mounted, adapted to move said illumination unit and said image reading unit along said transparent member in the sub-scanning direction.

9. The apparatus according to claim 1, wherein said image reading unit is capable of reading a color image.

10. The apparatus according to claim 1, wherein said image reading unit includes a contact image sensor.

11. An image reading apparatus comprising:
    an illumination unit adapted to illuminate a subject;
    an image reading unit adapted to read an image of the subject illuminated by said illumination unit;
    a transparent member having a light transmitting property provided between the subject and said image reading unit;
    a reference member, which is provided on said transparent member, adapted for use as an illuminance reference in order to correct an image signal that is output from said image reading unit;
    a case adapted to mount said illuminating unit and said image reading unit and move in a sub-scanning direction alone said transparent member; and
    a light shielding member provided on a frame of said case along a main scanning direction, wherein said light shielding member is in contact with said transparent member so as to prevent light, which enters from outside through said transparent member, from being incident on said reference member.

12. The apparatus according to claim 11, wherein said light shielding member projects toward the side of said transparent member from the side of said image reading unit.

13. The apparatus according to claim 11, wherein said light shielding member abuts against said transparent member without any clearance.

14. The apparatus according to claim 11, wherein said light shielding member has a length greater than that of said reference member along a main scanning direction.

15. The apparatus according claim 11, wherein two of said light shielding member are provided at a spacing greater than the width of said image reading unit along a sub-scanning direction.

16. The apparatus according to claim 11, wherein said light shielding member surrounds the approximate periphery of said image reading unit.

17. The apparatus according to claim 11, wherein said light shielding member comprises a resilient member.

18. The apparatus according to claim 11, wherein said light shielding member comprises a sheet-like member.

19. The apparatus according to claim 11, wherein said light shielding member is substantially black.

20. The apparatus according to claim 11, further comprising a moving unit adapted to move said case along said transparent member in the sub-scanning direction.

21. The apparatus according to claim 11, wherein said image reading unit is capable of reading a color image.

22. The apparatus according to claim 11, wherein said image reading unit includes a contact image sensor.

23. An image reading apparatus comprising:

an illumination unit adapted to illuminate a subject;

an image reading unit having a line sensor adapted to read an image of the subject illuminated by said illumination unit;

a transparent member having a light transmitting property provided between the subject and said image reading unit;

a reference member, which is provided on said transparent member and extends in a main scanning direction of said line sensor, adapted for use as an illuminance reference for shading correction applied to an image signal that is output from said image reading unit; and a light shielding member provided along said reference member on a side of said image reading unit with respect to said transparent member, wherein said light shielding member is in contact with said transparent member and extends from said transparent member for a length capable of covering at least a part of a space between the surface of said transparent member and said image reading unit when said image reading unit is below said reference member.

* * * * *

UNITED STATES PATENT AND TRADEMARK OFFICE
CERTIFICATE OF CORRECTION

PATENT NO. : 6,892,945 B2
DATED : May 17, 2005
INVENTOR(S) : Shishido

It is certified that error appears in the above-identified patent and that said Letters Patent is hereby corrected as shown below:

Title page,
Item [56], References Cited, U.S. PATENT DOCUMENTS, please insert
-- 5,327,261; 6,532,349; 2002/0081040; 2002/0081023; 2002/0075524; and
2002/0055883 --; FOREIGN PATENT DOCUMENTS, please insert
-- JPA 2000-184128 --.

Signed and Sealed this

Sixth Day of September, 2005

JON W. DUDAS
*Director of the United States Patent and Trademark Office*